United States Patent
Taylor (10) Patent No.: US 9,605,402 B2
(45) Date of Patent: *Mar. 28, 2017

(54) RETAINING WALL SOIL REINFORCING CONNECTOR AND METHOD

(76) Inventor: Thomas P. Taylor, Colleyville, TX (US)

( * ) Notice: Subject to any disclaimer, the term of this patent is extended or adjusted under 35 U.S.C. 154(b) by 1268 days.

This patent is subject to a terminal disclaimer.

(21) Appl. No.: 13/100,927

(22) Filed: May 4, 2011

(65) Prior Publication Data

US 2011/0229274 A1   Sep. 22, 2011

Related U.S. Application Data

(63) Continuation-in-part of application No. 12/756,898, filed on Apr. 8, 2010, now Pat. No. 8,632,277, and a continuation-in-part of application No. 12/353,615, filed on Jan. 14, 2009, now Pat. No. 7,722,296.

(51) Int. Cl.
| | |
|---|---|
| *F16D 1/12* | (2006.01) |
| *F16D 3/00* | (2006.01) |
| *F16C 11/00* | (2006.01) |
| *E02D 29/02* | (2006.01) |

(Continued)

(52) U.S. Cl.
CPC ........ *E02D 29/0233* (2013.01); *B23K 11/002* (2013.01); *E02D 5/76* (2013.01); *E02D 29/0241* (2013.01); *Y10T 403/32221* (2015.01)

(58) Field of Classification Search
CPC ............. Y10T 403/43; Y10T 403/4327; Y10T 403/4363; B23K 11/002; E02D 5/76; F16B 25/0078; F16B 13/141; E04B 1/2608; E05B 19/0017; E05B 19/0023; E05B 19/35; E05B 19/0052; E05B 19/0064; E05B 27/0078; E05B 27/0082

USPC ...... 403/79, 81, 82, 83, 85, 88, 89; 405/262, 405/284, 285, 286; 411/418; 52/698, 52/712; 70/405, 406, 409

See application file for complete search history.

(56) References Cited

U.S. PATENT DOCUMENTS

| | | | |
|---|---|---|---|
| 991,041 A | 5/1911 | Toennes | |
| RE13,299 E | 10/1911 | Denison | |
| 1,069,792 A * | 8/1913 | Kruttschnitt | ............... 411/451.4 |

(Continued)

FOREIGN PATENT DOCUMENTS

| | | |
|---|---|---|
| EP | 427221 A | 5/1991 |
| EP | 0679768 | 2/1995 |

(Continued)

OTHER PUBLICATIONS

International Application No. PCT/US08/69011—International Search Report and Written Opinion dated Oct. 10, 2008.

(Continued)

*Primary Examiner* — Gregory Binda
*Assistant Examiner* — Nahid Amiri (57) ABSTRACT

An apparatus for connecting an earthen formation to a concrete facing of a mechanically stabilized earth (MSE) structure, and a method of manufacturing the same. A one-piece, flat, plate-like connector has a stem and a tab, wherein the stem is resistance welded to a soil reinforcing element embedded within the earthen formation. The tab is connected to a facing anchor attached to the concrete facing. The stem of the plate connector has grooves formed in its opposing sides and longitudinal channels to increase the strength of the resistance weld.

18 Claims, 4 Drawing Sheets

(51) Int. Cl.
  *B23K 11/00* (2006.01)
  *E02D 5/76* (2006.01)

(56) References Cited

U.S. PATENT DOCUMENTS

| | | | |
|---|---|---|---|
| 1,144,143 A | 6/1915 | McGillivray | |
| 1,813,912 A | 7/1931 | Clark | |
| 1,959,816 A | 5/1934 | Crum | |
| 1,992,785 A | 2/1935 | Steuer | |
| 2,061,751 A * | 11/1936 | Bosco | 269/240 |
| 2,096,937 A * | 10/1937 | McManus | 411/418 |
| 2,137,153 A | 11/1938 | Brozek | |
| 2,208,589 A | 7/1940 | Leemhuis | |
| 2,275,933 A | 3/1942 | Werner | |
| 2,316,712 A | 4/1943 | Prince | |
| 2,327,640 A | 8/1943 | Hendry | |
| 2,552,712 A | 5/1951 | Ellis | |
| 2,703,963 A | 3/1955 | Gutierrez | |
| 2,881,614 A | 4/1959 | Preininger | |
| 3,597,928 A | 8/1971 | Pilaar | |
| 3,656,725 A * | 4/1972 | Clark | F16B 21/186 248/507 |
| 3,680,748 A | 8/1972 | Brunhuber | |
| 3,998,022 A | 12/1976 | Muse | |
| 4,075,924 A | 2/1978 | McSherry | |
| 4,116,010 A | 9/1978 | Vidal | |
| 4,117,686 A | 10/1978 | Hilfiker | |
| 4,123,881 A | 11/1978 | Muse | |
| 4,134,241 A | 1/1979 | Walton | |
| 4,286,895 A | 9/1981 | Poli | |
| 4,324,508 A | 4/1982 | Hilfiker | |
| 4,329,089 A | 5/1982 | Hilfiker | |
| 4,341,491 A | 7/1982 | Neumann | |
| 4,343,572 A | 8/1982 | Hilfiker | |
| 4,391,557 A | 7/1983 | Hilfiker | |
| 4,411,255 A | 10/1983 | Lee | |
| 4,470,728 A | 9/1984 | Broadbent | |
| 4,505,621 A | 3/1985 | Hilfiker | |
| 4,514,113 A | 4/1985 | Neumann | |
| 4,616,959 A | 10/1986 | Hilfiker | |
| 4,643,618 A | 2/1987 | Hilfiker | |
| 4,651,975 A | 3/1987 | Howell | |
| 4,653,962 A | 3/1987 | McKittrick | |
| 4,661,023 A | 4/1987 | Hilfiker | |
| 4,664,552 A | 5/1987 | Schaaf | |
| 4,710,062 A | 12/1987 | Vidal | |
| 4,725,170 A | 2/1988 | Davis | |
| 4,774,763 A * | 10/1988 | Palecek et al. | 29/874 |
| 4,834,584 A | 5/1989 | Hilfiker | |
| 4,856,939 A | 8/1989 | Hilfiker | |
| 4,914,876 A | 4/1990 | Forsberg | |
| 4,920,712 A | 5/1990 | Dean, Jr. | |
| 4,929,125 A | 5/1990 | Hilfiker | |
| 4,952,098 A | 8/1990 | Grayson | |
| 4,961,673 A | 10/1990 | Pagano | |
| 4,968,186 A | 11/1990 | Ogorchock | |
| 4,993,879 A | 2/1991 | Hilfiker | |
| 5,044,833 A | 9/1991 | Wilfiker | |
| 5,066,169 A | 11/1991 | Gavin | |
| 5,076,735 A | 12/1991 | Hilfiker | |
| 5,139,369 A | 8/1992 | Jaecklin | |
| 5,156,496 A | 10/1992 | Vidal | |
| 5,190,413 A | 3/1993 | Carey | |
| 5,207,038 A | 5/1993 | Negri | |
| RE34,314 E | 7/1993 | Forsberg | |
| 5,257,880 A | 11/1993 | Janopaul | |
| 5,259,704 A | 11/1993 | Orgorchock | |
| 5,417,523 A | 5/1995 | Scales | |
| 5,451,120 A | 9/1995 | Martinez-Gonzalez | |
| 5,456,554 A | 10/1995 | Barrett | |
| 5,474,405 A | 12/1995 | Anderson | |
| D366,191 S | 1/1996 | Gay | |
| 5,484,235 A | 1/1996 | Hilfiker | |
| 5,487,623 A | 1/1996 | Anderson | |
| 5,494,379 A | 2/1996 | Anderson | |
| 5,507,599 A | 4/1996 | Anderson | |
| 5,522,682 A | 6/1996 | Egan | |
| 5,525,014 A | 6/1996 | Brown | |
| 5,531,547 A | 7/1996 | Shimada | |
| 5,533,839 A | 7/1996 | Shimada | |
| 5,582,492 A | 12/1996 | Doyle | |
| 5,622,455 A | 4/1997 | Anderson | |
| 5,702,208 A | 12/1997 | Hilfiker | |
| 5,715,717 A * | 2/1998 | Widen | E05B 19/0017 70/406 |
| 5,722,799 A | 3/1998 | Hilfiker | |
| 5,730,559 A | 3/1998 | Anderson | |
| 5,733,072 A | 3/1998 | Hilfiker | |
| D393,989 S | 5/1998 | Groves | |
| 5,749,680 A | 5/1998 | Hilfiker | |
| 5,797,706 A | 8/1998 | Segrestin | |
| 5,807,030 A | 9/1998 | Anderson | |
| 5,820,305 A | 10/1998 | Taylor | |
| 5,947,643 A | 9/1999 | Anderson | |
| 5,951,209 A | 9/1999 | Anderson | |
| 5,971,699 A | 10/1999 | Winski | |
| 5,975,809 A | 11/1999 | Taylor | |
| 5,975,810 A | 11/1999 | Taylor | |
| 6,024,516 A | 2/2000 | Taylor | |
| 6,050,748 A | 4/2000 | Anderson | |
| 6,079,908 A | 6/2000 | Anderson | |
| 6,086,288 A | 7/2000 | Ruel | |
| D433,291 S | 11/2000 | Shamoon | |
| 6,186,703 B1 | 2/2001 | Shaw | |
| 6,336,773 B1 | 1/2002 | Anderson | |
| 6,345,934 B1 | 2/2002 | Jailoux | |
| 6,357,970 B1 | 3/2002 | Hilfiker | |
| 6,517,293 B2 | 2/2003 | Taylor | |
| 6,595,726 B1 | 7/2003 | Egan | |
| 6,793,436 B1 | 9/2004 | Ruel | |
| 6,802,675 B2 | 10/2004 | Timmons | |
| 6,805,201 B2 * | 10/2004 | Nish et al. | 166/367 |
| 6,857,823 B1 | 2/2005 | Hilfiker | |
| 6,939,087 B2 | 9/2005 | Ruel | |
| 7,033,118 B2 | 4/2006 | Hilfiker | |
| 7,073,983 B2 | 7/2006 | Hilfiker | |
| 7,114,891 B2 * | 10/2006 | Hakansson | B23G 7/02 407/29 |
| 7,270,502 B2 | 9/2007 | Brown | |
| 7,281,882 B2 | 10/2007 | Hilfiker | |
| 7,399,144 B2 | 7/2008 | Kallen | |
| D599,630 S | 9/2009 | Taylor | |
| 7,722,296 B1 | 5/2010 | Taylor | |
| 7,857,540 B2 * | 12/2010 | Ruel et al. | 403/208 |
| 7,891,912 B2 | 2/2011 | Taylor | |
| 7,972,086 B2 | 7/2011 | Taylor | |
| 7,980,790 B2 | 7/2011 | Taylor | |
| 8,079,782 B1 | 12/2011 | Hilfiker | |
| 8,894,367 B2 * | 11/2014 | Lee et al. | 416/96 R |
| 2002/0044840 A1 | 4/2002 | Taylor | |
| 2002/0067959 A1 | 6/2002 | Thornton | |
| 2003/0223825 A1 | 12/2003 | Timmons et al. | |
| 2004/0018061 A1 | 1/2004 | Jannsson | |
| 2004/0161306 A1 | 8/2004 | Ruel | |
| 2004/0179902 A1 | 9/2004 | Ruel | |
| 2005/0111921 A1 | 5/2005 | Taylor et al. | |
| 2005/0163574 A1 | 7/2005 | Hilfiker et al. | |
| 2005/0271478 A1 | 12/2005 | Ferraiolo | |
| 2005/0286981 A1 | 12/2005 | Robertson et al. | |
| 2006/0204342 A1 | 9/2006 | Hilfiker et al. | |
| 2006/0239783 A1 | 10/2006 | Kallen | |
| 2007/0014638 A1 | 1/2007 | Brown | |
| 2009/0016825 A1 | 1/2009 | Taylor | |
| 2009/0067933 A1 | 3/2009 | Taylor | |
| 2009/0285639 A1 | 11/2009 | Taylor | |
| 2009/0304456 A1 | 12/2009 | Taylor | |
| 2010/0247248 A1 | 9/2010 | Taylor | |
| 2011/0170957 A1 | 7/2011 | Taylor | |
| 2011/0170958 A1 | 7/2011 | Taylor | |
| 2011/0170960 A1 | 7/2011 | Taylor | |
| 2011/0229274 A1 | 9/2011 | Taylor | |
| 2011/0311317 A1 | 12/2011 | Taylor | |
| 2011/0311318 A1 | 12/2011 | Taylor | |

(56) References Cited

U.S. PATENT DOCUMENTS

FOREIGN PATENT DOCUMENTS

| FR | 530097 | 9/1921 |
|---|---|---|
| FR | 1006087 | 1/1952 |
| JP | 3114014 | 6/1991 |
| JP | 08209703 | 8/1996 |
| JP | 08326074 | 12/1996 |
| KR | 1020080058697 | 6/2008 |
| KR | 1020100027693 | 3/2010 |
| WO | WO9413890 | 6/1994 |
| WO | WO2009009369 | 1/2009 |
| WO | WO2009140576 | 11/2009 |
| WO | WO2010082940 | 7/2010 |
| WO | WO2011084983 | 7/2011 |
| WO | WO2011084986 | 7/2011 |
| WO | WO2011084989 | 7/2011 |
| WO | WO2011127349 | 10/2011 |
| WO | WO2011059807 | 12/2011 |
| WO | WO2011159808 | 12/2011 |

OTHER PUBLICATIONS

International Application No. PCT/US09/031494—International Search Report and Written Opinion dated Mar. 13, 2009.
International Application No. PCT/US09/44099—International Search Report and Written Opinion dated Aug. 12, 2009.
International Application No. PCT/US08/069011—International Preliminary Report on Patentability dated Jan. 21, 2010.
International Application No. PCT/US10/036991—International Search Report and Written Opinion dated Aug. 2, 2010.
International Application No. PCT/US09/44099—International Preliminary Report on Patentability dated Nov. 25, 2010.
International Application No. PCT/US2010/036991—International Preliminary Examination Reported mailed Jul. 14, 2011.
International Application No. PCT/US09/0031494—International Preliminary Report on Patentability dated Jul. 19, 2011.
International Application No. PCT/US2010/036991—Corrected International Preliminary Examination Report mailed Aug. 15, 2011.
International Application No. PCT/US2011/031688—International Search Report and Written Opinion dated Nov. 30, 2011.
International Application No. PCT/US2011/040540—International Search Report and Written Opinion dated Feb. 17, 2012.
International Application No. PCT/US2011/040543—International Search Report and Written Opinion dated Feb. 21, 2012.
International Application No. PCT/US2011/040541—International Search Report and Written Opinion dated Feb. 27, 2012.
Webster's tenth edition, "Collegiate Dictionary", p. 423; 1998.

* cited by examiner

RETAINING WALL SOIL REINFORCING CONNECTOR AND METHOD

CROSS-REFERENCE TO RELATED APPLICATIONS

The present application is a continuation-in-part application of U.S. Utility patent application Ser. No. 12/756,898, entitled "Retaining Wall Soil Reinforcing Connector and Method," filed on Apr. 8, 2010, now U.S. Pat. No. 8,632,277 which claims priority as a continuation-in-part application to U.S. Utility patent application Ser. No. 12/353,615, similarly titled and filed on Jan. 14, 2009 now U.S. Pat. No. 7,722,296. The contents of each priority application are hereby incorporated by reference in their entirety.

BACKGROUND

Retaining wall structures that use horizontally positioned soil inclusions to reinforce an earth mass in combination with a facing element are referred to as mechanically stabilized earth (MSE) structures. MSE structures can be used for various applications including retaining walls, bridge abutments, dams, seawalls, and dikes.

The basic MSE implementation is a repetitive process where layers of backfill and horizontally-placed soil reinforcing elements are positioned one atop the other until a desired height of the earthen structure is achieved. Typically, grid-like steel mats or welded wire mesh are used as soil reinforcing elements. In most applications, the soil reinforcing elements consist of parallel, transversely-extending wires welded to parallel, longitudinally-extending wires, thus forming a grid-like mat or structure. Backfill material and the soil reinforcing mats are combined and compacted in series to form a solid earthen structure, taking the form of a standing earthen wall.

In some instances, the soil reinforcing elements can be attached or otherwise coupled to a substantially vertical wall either forming part of the MSE structure or offset a short distance therefrom. The vertical wall is typically made either of concrete or a steel wire facing and not only serves to provide tensile resistance to the soil reinforcing elements but also prevents erosion of the MSE structure. The soil reinforcing elements extending from the compacted backfill may be attached directly to a vertical wall of the facing in a variety of configurations.

Although there are several different configurations and types of soil reinforcing elements known in the art, including different materials from which they are made, it nonetheless remains desirable to find improved configurations or materials that provide greater resistance to shear forces inherent in such structures.

SUMMARY

Embodiments of the disclosure may provide a plate connection stud comprising a planar tab defining at least one hole therein and a planar stem extending longitudinally from the planar tab, the planar stem having first and second sides defining a plurality of grooves therein.

Embodiments of the disclosure may further provide a method of manufacturing a soil reinforcing element assembly. The method may include punching a hole in a planar tab of a plate connection stud, the plate connection stud further comprising a planar stem extending longitudinally from the planar tab, and forming a plurality of grooves in opposing first and second sides of the planar stem. The method may also include positioning the plate connection stud in a resistance welding device to be welded to a soil reinforcing element, the soil reinforcing element having first and second longitudinal wires coupled to a plurality of transverse wires, the first and second longitudinal wires terminating at first and second lead ends, respectively. The method may further include positioning the first lead end between the first side of the planar stem and a first electrode of the resistance welding device, positioning the second lead end between the second side of the planar stem and a second electrode of the resistance welding device, and biasing the first and second lead ends against the first and second sides of the planar stem, respectively, with the first and second electrodes. The method may then include activating the resistance welding device to weld the first and second lead ends to the first and second sides, respectively, and subsequently releasing the first and second electrodes from the first and second lead ends.

Embodiments of the disclosure may further provide a system for securing a facing to an earthen formation. The system may include a soil reinforcing element having first and second longitudinal wires welded to a plurality of transverse wires, the first and second longitudinal wires terminating at first and second lead ends, respectively, and a plate connection stud comprising a planar tab defining at least one hole therein and a planar stem extending longitudinally from the planar tab, the planar stem having first and second sides defining a plurality of grooves therein, wherein the first and second lead ends are coupled to the first and second sides, respectively. The system may also include a facing anchor having first and second connection plates extending from a back face of a facing and being vertically-offset from each other a distance X, each connection plate defining a horizontally-disposed perforation, and a coupling device extendable through each horizontally-disposed perforation and the hole of the plate connection stud to secure the plate connection stud to the facing anchor, wherein the soil reinforcing element is capable of swiveling in a horizontal plane and shifting vertically over the distance X.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The present disclosure is an improved apparatus and method of connecting an earthen formation to a concrete facing of a mechanically stabilized earth (MSE) structure. In particular, disclosed is a low-cost, one-piece MSE connector, and variations of the same, that allows soil reinforcing mats to swivel in order to avoid vertically-disposed obstructions, such as drainage pipes, catch basins, bridge piles, or bridge piers, which may be encountered in the adjacent backfill field. The MSE connector may also allow the connected soil reinforcing mats to shift vertically in reaction to MSE settling or thermal expansion/contraction of the MSE structure. The ability of the soil reinforcing element to shift and swivel provides a distinct advantage in that the structural integrity of the MSE system is not jeopardized over time, but that it may move in response to natural occurrences.

Figure 1A:
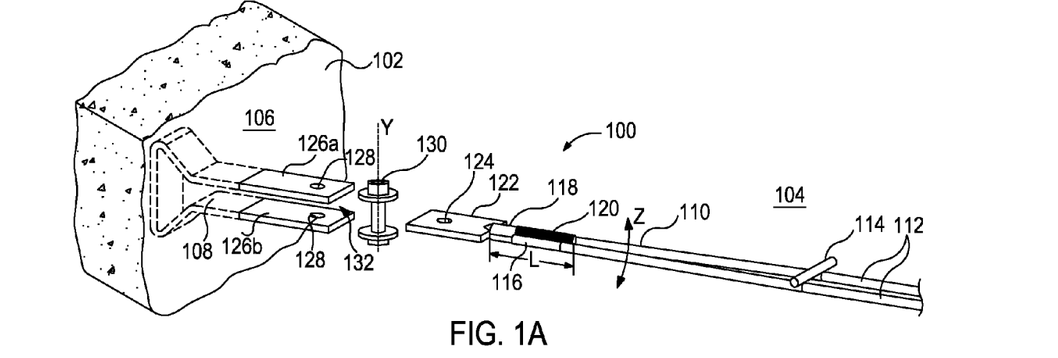
FIG. 1A is an exploded perspective view of a soil reinforcing system, according to one or more aspects of the present disclosure.
Figure 1B:
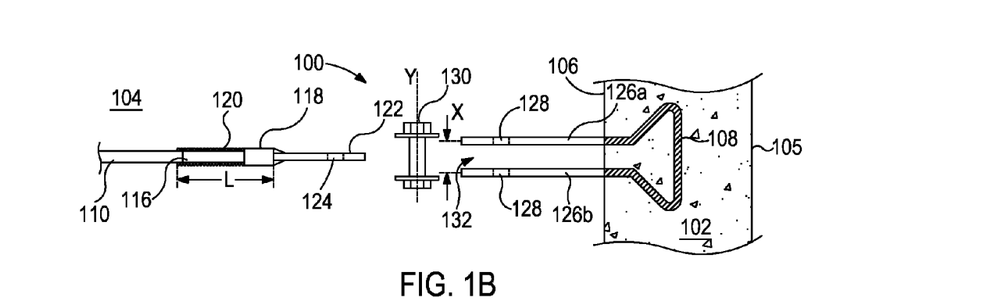
FIG. 1B is a side view of the system shown in FIG. 1A.
Figure 1C:
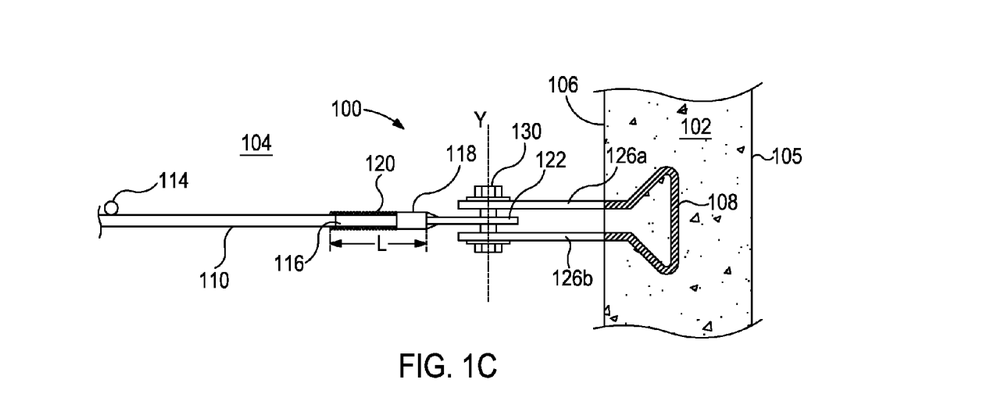
FIG. 1C is a side view of the system shown in FIG. 1A coupled together, according to one or more aspects of the present disclosure.

Referring to FIGS. 1A-1C, illustrated is an exemplary system 100 for securing a facing 102 to an earthen formation 104, according to one or more aspects of the disclosure. The facing 102 may include an individual precast concrete panel or, alternatively, a plurality of interlocking precast concrete modules or wall members that are assembled into an interlocking relationship. In another embodiment, the facing 102 may be a uniform, unbroken expanse of concrete or the like which may be poured or assembled on site. The facing 102 may generally define an exposed face 105 (FIGS. 1B and 1C) and a back face 106. The exposed face 105 is usually a decorative architectural facing, while the back face 106 is located adjacent the earthen formation 104. Cast into the facing 102, or otherwise attached thereto, and protruding generally from the back face 106, is at least one exemplary facing anchor 108. In other embodiments, the facing anchor 108 may be mechanically-fastened to the back face 106, for example, using bolts or other mechanical fasteners.

The earthen formation 104 may encompass an MSE structure including a plurality of soil reinforcing elements 110 that extend horizontally into layers of backfill to add tensile capacity thereto. In an exemplary embodiment, the soil reinforcing elements 110 may serve as tensile resisting elements positioned in the backfill in a substantially horizontal alignment at spaced-apart relationships to one another against the compacted soil. Depending on the application, grid-like steel mats or welded wire mesh may be used as soil reinforcement elements 110, but it is not uncommon to employ "geogrids" made of plastic or other materials to accomplish the same end.

In the illustrated exemplary embodiment, the soil reinforcing element 110 may include a welded wire grid having a pair of longitudinal wires 112 that are substantially parallel to each other. The longitudinal wires 112 may be joined to a plurality of transverse wires 114 in a generally perpendicular fashion by welds at their intersections, thus forming a welded wire gridworks. In exemplary embodiments, the spacing between each longitudinal wire 112 may be about 2 in., while spacing between each transverse wire 114 may be about 6 in. As can be appreciated, however, the relative spacing and configuration may vary depending on the mixture of tensile force requirements that the reinforcing element 110 must resist.

In one or more embodiments, the lead ends 116 of the longitudinal wires 112 may generally converge toward one another and be welded or otherwise attached to a connection stud 118. The connection stud 118 may include a first end or a stem 120 coupled or otherwise attached to a second end or a tab 122. In at least one embodiment, the stem 120 may include a cylindrical body having an axial length L. As illustrated, the lead ends 116 may be coupled or otherwise attached to the stem 120 along at least a portion of the axial length L. In one embodiment, the tab 122 may be a substantially planar plate and define at least one centrally-located perforation or hole 124.

In at least one embodiment, the facing anchor 108 may include a pair of horizontally-disposed connection points or plates 126a, 126b cast into and extending from the back face 106 of the panel 102. As can be appreciated, other embodiments include attaching the facing anchor directly to the back face 106, without departing from the disclosure. Other embodiments of the disclosure contemplate a facing anchor 108 having a single horizontal plate 126 (not shown), where the tab 122 is coupled only to the single plate 126 via appropriate coupling devices.

Each plate 126a, b may include at least one perforation 128 adapted to align with a corresponding perforation 128 on the opposing plate 126a, b. As illustrated in FIG. 1B, the plates 126, b may be vertically-offset from each other a distance X, thereby providing a gap 132 configured to receive the tab 122 for connection. The tab 122 may be inserted into the gap 132 to substantially align the hole 124 with the perforations 128 of each plate 126a, b. A coupling device, such as a nut and bolt assembly 130, or the like, may then be used to secure the connection stud 118 (and thus the soil reinforcing element 110) to the facing anchor 108. In one or more embodiments, the nut and bolt assembly 130 may include a threaded bolt having a central axis Y and being configured to mate with a nut and washer assembly. In other embodiments, the nut and bolt assembly 130 may be replaced with a pin-type connection having an end that prevents it from removal, such as a bent-over re-bar portion.

In the illustrated arrangement, the soil reinforcing element 110 (as coupled to the connection stud 118) may be allowed to swivel or rotate about axis Y in a horizontal plane Z (FIG. 1A). To avoid obstructions, such as a drainage pipe, catch basin, bridge pile, bridge pier, or the like, the soil reinforcing element 110 may be pivoted about axis Y to any angle relative to the back face 106, thereby swiveling to a position in the backfill where no obstacle exists.

Moreover, the gap 132 defined between two vertically-offset plates 126a, b may allow for a distance of settling of either the MSE structure or the soil reinforcing element 110 without the soil reinforcing element 110 binding on the facing 102. For instance, during settling the tab 122 may be able to shift or slide vertically about the nut and bolt assembly 130 the distance X, thereby compensating for a potential vertical drop of the soil reinforcing element 110 and preventing any buckling of the concrete facing 102. Varying designs of anchors 108 may be used that increase or decrease the distance X to compensate for potential settling or other MSE mechanical phenomena.

Furthermore, it is not uncommon for concrete facings 102 to shift in reaction to MSE settling or thermal expansion/contraction. In instances where such movement occurs, the soil reinforcing elements 110 are capable of correspondingly swiveling about axis Y and shifting the vertical distance X to prevent misalignment, buckling, or damage to the concrete facing 102.

Figure 2A:
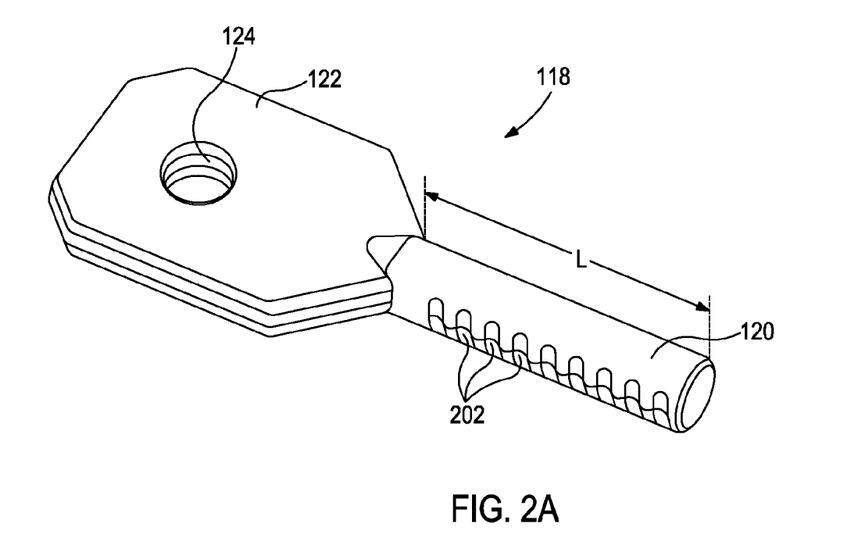
FIG. 2A is an isometric view of a connection stud, according to one or more aspects of the present disclosure.
Figure 2B:
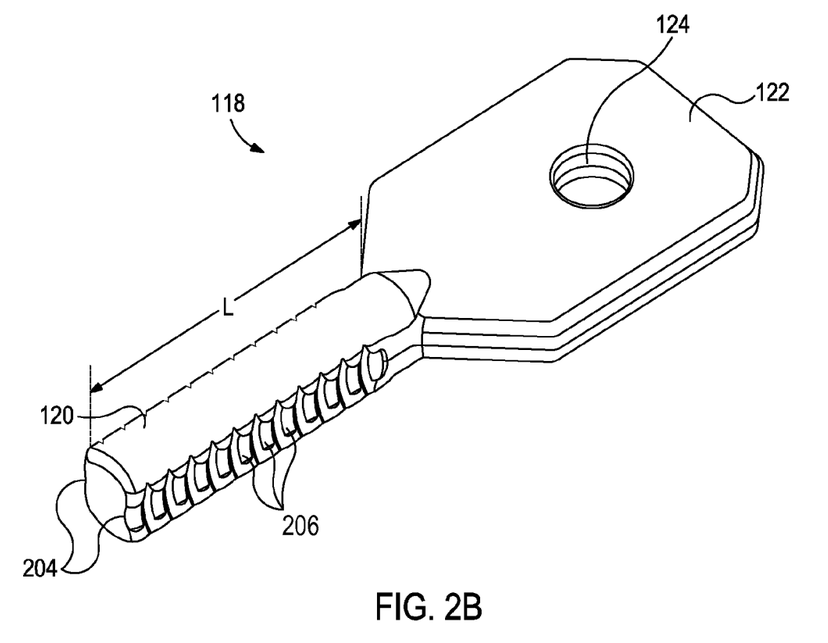
FIG. 2B is an isometric view of another connection stud, according to one or more aspects of the present disclosure.

Referring now to FIGS. 2A and 2B, illustrated is one or more exemplary embodiments of the connection stud 118. In one embodiment, the connection stud 118 can be created from a one-piece forging process. In other embodiments, however, the connection stud 118 can be created by welding or otherwise attaching the stem 120 to the tab 122. As illustrated, the stem 120 may include a plurality of indentations or grooves 202 defined along its axial length L. In one embodiment, the grooves 202 may be cast or otherwise machined into the stem 120. In other embodiments, the grooves 202 can include standard thread markings machined along the axial length L of the stem 120. As can be appreciated, the grooves 202 may provide a more suitable welding surface for attaching the lead ends 116 of the longitudinal wires 112 (FIGS. 1A-1C) thereto, thereby resulting in a stronger resistance weld.

As illustrated in the embodiment shown in FIG. 2B, the stem 120 may include an axial channel 204 extending along the axial length L on opposing sides. In at least one embodiment, the axial channels 204 may be formed during a casting or forging process. In other embodiments, the axial channels 204 may be generated by applying longitudinal pressure to the opposing sides of the stem 120 with a cylindrical die or the like (not shown). The axial channels 204 may include the grooves 206 machined or otherwise formed therein. The grooves 206 may be generated during the forging process, or via a cylindrical die that forms the axial channels 204. In other embodiments, however, the grooves 206 may be subsequently machined into the axial channels 204 after a forging process and/or the application of a cylindrical die. As can be appreciated, the axial channels 204 may add arcuate surface area for welding the lead ends 116 of the longitudinal wires 112, thereby creating a more solid resistance weld. Moreover, because of the added amount of arcuate surface area, the axial channels 204 may also protect the resistance weld from corrosion.

Figure 3A:
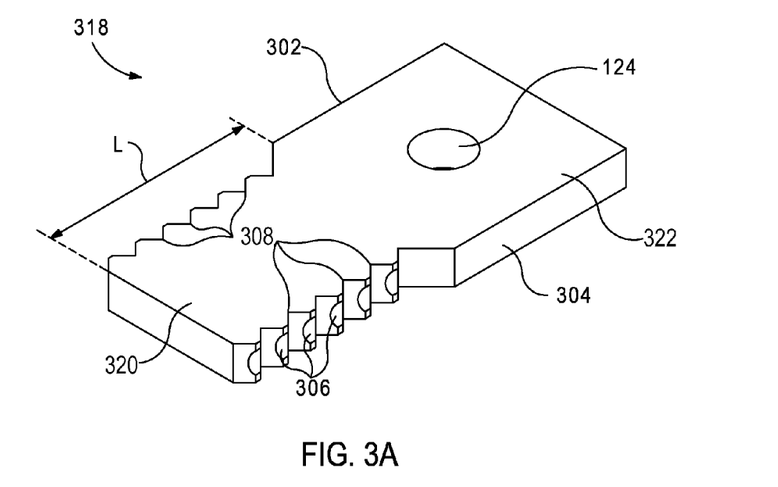
FIG. 3A is an isometric view of an exemplary plate connection stud, according to one or more aspects of the present disclosure.
Figure 3B:
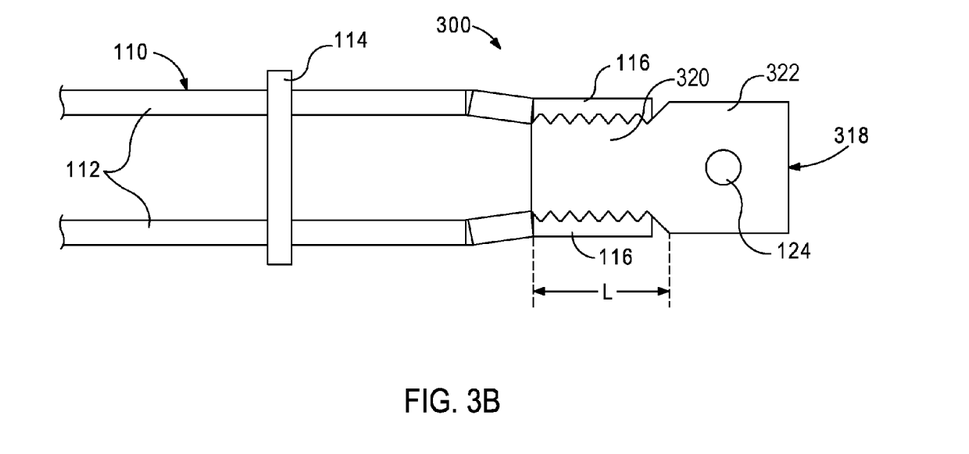
FIG. 3B is a plan view of a soil reinforcing element coupled to the plate connection stud of FIG. 3A, according to one or more aspects of the present disclosure.

Referring now to FIGS. 3A and 3B, illustrated is an exemplary plate connection stud 318 (FIG. 3A) used in conjunction with a soil reinforcing element assembly 300 (FIG. 3B). As illustrated, the soil reinforcing element assembly 300 includes the plate connection stud 318 coupled or otherwise attached to a soil reinforcing element 110. The plate connection stud 318 may be similar in some respects to the connection stud 118 described above and therefore may be best understood with reference to FIGS. 2A and 2B, where like numerals correspond to like elements that will not be described again in detail. It will be appreciated that the plate connection stud 318 may also be used in conjunction with the facing anchor 108 generally described above with reference to FIGS. 1A-1C.

The plate connection stud 318 may be a generally flat, plate-like structure having a generally planar stem 320 extending from a generally planar tab 322. In one embodiment, the plate connection stud 318 is formed or otherwise machined from a generally flat piece of sheet metal via a punch pressing process, or the like. In other embodiments, the plate connection stud 318 may be the result of a forging or a casting process. The planar tab defines a hole 124, as described above.

As illustrated, the plate connection stud 318 may include a first side 302 and a second side 304, and a plurality of serrations or grooves 308 may be defined in each side 302, 304 along at least the length L of the planar stem 320. The grooves 308 may be cast, punched, or otherwise machined into the planar stem 320. In other embodiments, a shaped die (not shown) may be used to cold-form the grooves 308 into the planar stem 320. As with embodiments described above, the grooves 308, and especially the extended or protruding ridges defined by the grooves 308, provide a stronger resistance weld for attaching the lead ends 116 of the longitudinal wires 112 to each side 302, 304 of the planar stem 320.

In one embodiment, the planar stem 320 also defines longitudinal channels 306 extending along the length L on its opposing sides 302, 304. The longitudinal channels 306 may be substantially similar to the axial channels 204 described above, except formed in the planar stem 320 as opposed to a generally cylindrical stem 120, as in the embodiments discussed with reference to FIGS. 2A and 2B. The longitudinal channels 306 may provide a generally concave or arcuate surface area extending longitudinally along the sides 302, 304 of the planar stem 320, and may be combined with the grooves 308. The channels 306 may be formed during a casting or forging process. In other embodiments, however, the longitudinal channels 306 may be created through cold-forming by applying longitudinal pressure against the opposing sides 302, 304 of the planar stem 320 with a cylindrical die or the like (not shown).

Each longitudinal channel 306 adds arcuate surface/contact area for welding to the lead ends 116 of the longitudinal wires 112. The added arcuate surface area results in a more solid and corrosion-resistant resistance weld. Moreover, the longitudinal channels 306 may be used to more properly seat the lead ends 116 against the grooves 308. As can be appreciated, this may increase the quality control and quality assurance of the ensuing resistance weld.

Figure 4:
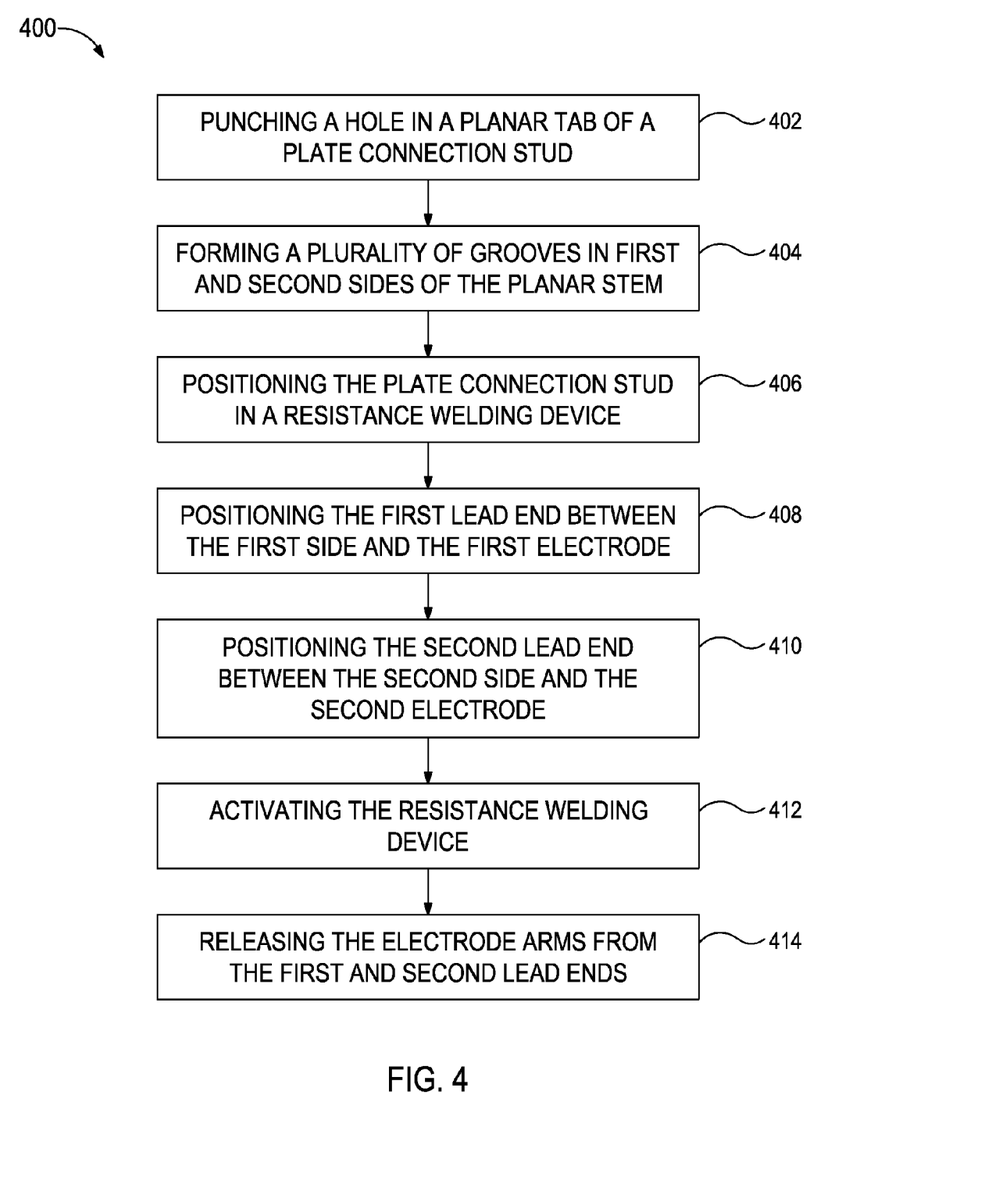
FIG. 4 is a flowchart of a method of manufacturing as soil reinforcing element assembly, according to one or more aspects of the present disclosure.

Referring now to FIG. 4, with continued reference to FIGS. 3A and 3B, illustrated is a flowchart of a method 400 of manufacturing a soil reinforcing element assembly, such as the soil reinforcing assembly 300 shown in FIG. 3B. The method 400 may include punching a hole in a planar tab of a plate connection stud, as at 402. The planar connection stud may be the planar connection stud 318 described above and may therefore include a planar stem 320 extending longitudinally from the planar tab 322.

A plurality of grooves may be formed in opposing first and second sides of the planar stem, as at 404. The plurality of grooves 308 may be formed in the first and second sides 302, 304 via a variety of processes such as, but not limited to, machining, cold-forming, casting, combinations thereof, or the like. In one embodiment, longitudinal channels 306 may be formed in the first and second sides 302, 204 of the planar stem 320. This may be done via a variety of processes such as, but not limited to, machining, cold-forming, casting, combinations thereof, or the like.

The method 400 may further include positioning the plate connection stud in a resistance welding device to be welded to a soil reinforcing element, as at 406. The soil reinforcing element may be substantially similar to the soil reinforcing element 110 described above with reference to FIGS. 1A-1C, and therefore may include first and second lead ends 116. The resistance welding device may be any known resistance welder known in the art and adapted to produce a weld through a combination of electrical resistance and pressure. The resistance welding device may include first and second electrodes carried by first and second electrode arms, respectively. The electrodes may be made of copper and the electrode arms may be adapted to apply pressure and current to the work-piece, which in this instance includes the first and second lead ends 116 and the first and second sides 302, 304 of the planar stem 320. The electrode arms may be formed with concave slots adapted to seat the lead ends 116 as the arms are pressed toward the first and second sides 302, 304 for welding.

To that end, the first lead end may be positioned between the first side of the planar stem and the first electrode of the resistance welding device, as at 408, and the second lead end may be positioned between the second side of the planar stem and the second electrode of the resistance welding device, as at 410. Using the electrode arms, the first and second electrodes may bias the lead ends against the first and second sides, as at 412. The electrode arms may be mechanically-actuated to force the first and second lead ends 116 into contact with the first and second sides 302, 304, respectively. In one embodiment, the amount of biasing force applied by the electrode arms may be adjustable depending on the desired weld.

The resistance welding device may then be activated to weld the first and second lead ends to the first and second sides, respectively, as at 414. In operation, electricity is passed to the electrodes as the lead ends 116 make contact with the sides 302, 304, thereby creating a localized, high electrical resistance. Specifically, small points of contact are made between the lead ends 116 and the ridges of the plurality of grooves 308 formed in the planar stem 320. As the points of contact begin to melt and form pools of molten metal, the pressure applied by the electrode arms forces the lead ends 116 deeper into the molten metal. In one embodiment, the lead ends 116 may slightly converge toward one another during this process. In other embodiments, the lead ends 116 may be configured such that relative convergence with respect to each other does not occur. The pressure is maintained until after the electricity has stopped in order to allow the molten steel to cool into one unified mass and prevent the lead ends 116 from un-fusing from the plate connection stud 318. The first and second electrode arms may then release the first and second lead ends, as at 414.

Accordingly, a strong resistance weld is made without the need to add filler welding material to the connection stud, such as in other welding processes (e.g., TIG welding, arc welding applications). Moreover, the design and addition of the plurality of grooves and longitudinal channels provides for a more solid resistance weld that is less-prone to corrosion overtime, unlike other welding processes that often generate weld gaps that promote and accelerate corrosion.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A plate connection stud comprising:
   a planar tab defining at least one hole therein;
   a planar stem extending longitudinally from the planar tab and having first and second sides;
   a plurality of grooves formed on the first and second sides, the plurality of grooves defining ridges protruding from the first and second sides and extending in a direction perpendicular to a longitudinal axis of the planar stem; and
   at least one concave channel defined in at least one protruding ridge, the concave channel extending in a direction perpendicular to the at least one protruding ridge.

2. The plate connection stud of claim 1, wherein the plate connection stud is punched from a flat sheet of metal.

3. The plate connection stud of claim 1, wherein the plurality of grooves are machined into the first and second sides.

4. The plate connection stud of claim 1, wherein the plurality of grooves are cast into the first and second sides.

5. The plate connection stud of claim 1, wherein the plurality of grooves are cold-formed into the first and second sides.

6. The plate connection stud of claim 1, wherein the at least one concave channel is machined into the at least one protruding ridge.

7. The plate connection stud of claim 1, wherein the at least one concave channel is cold-formed into the at least one protruding ridge.

8. A method of manufacturing a soil reinforcing element assembly, comprising:
   punching a hole in a planar tab of a plate connection stud, the plate connection stud further comprising a planar stem extending longitudinally from the planar tab;
   forming a plurality of grooves in opposing first and second sides of the planar stem, the plurality of grooves defining ridges protruding from the first and second sides and extending in a direction perpendicular to a longitudinal axis of the planar stem;
   forming at least one concave channel in at least one protruding ridge, the concave channel extending in a direction perpendicular to the at least one protruding ridge;

positioning the plate connection stud in a resistance welding device to be welded to a soil reinforcing element, the soil reinforcing element having first and second longitudinal wires coupled to a plurality of transverse wires, the first and second longitudinal wires terminating at first and second lead ends, respectively;

positioning the first lead end between the first side of the planar stem and a first electrode of the resistance welding device;

positioning the second lead end between the second side of the planar stem and a second electrode of the resistance welding device;

biasing the first and second lead ends against the first and second sides of the planar stem, respectively, with the first and second electrodes;

activating the resistance welding device to weld the first and second lead ends to the first and second sides, respectively; and releasing the first and second electrodes from the first and second lead ends.

9. The method of claim 8, wherein forming the plurality of grooves in the opposing first and second sides of the planar stem further comprises machining the plurality of grooves into the first and second sides.

10. The method of claim 8, wherein forming the plurality of grooves in the opposing first and second sides of the planar stem further comprises cold-forming the plurality of grooves into the first and second sides.

11. The method of claim 8, wherein forming the plurality of grooves in the opposing first and second sides of the planar stem further comprises casting the plurality of grooves into the first and second sides.

12. The method of claim 8, wherein the first and second electrodes are arranged on first and second electrode arms, respectively, the method further comprising seating the first and second lead ends in corresponding concave slots formed in the first and second electrode arms.

13. The method of claim 12, further comprising adjusting a biasing force applied by the first and second electrode arms on the first and second lead ends against the first and second sides of the planar stem.

14. A system for securing a facing to an earthen formation, comprising:
a soil reinforcing element having first and second longitudinal wires welded to a plurality of transverse wires, the first and second longitudinal wires terminating at first and second lead ends, respectively;
a plate connection stud comprising,
a planar tab defining at least one hole therein, and
a planar stem extending longitudinally from the planar tab and having first and second sides, wherein
a plurality of grooves are formed on the first and second sides,
the plurality of grooves define ridges protruding from the first and second sides and extending in a direction perpendicular to a longitudinal axis of the planar stem,
at least one concave channel is defined in at least one protruding ridge,
the concave channel extends in a direction perpendicular to the at least one protruding ridge, and
the first and second lead ends are coupled to the first and second sides, respectively;
a facing anchor having first and second connection plates extending from a back face of a facing and being vertically-offset from each other a distance X, each connection plate defining a horizontally-disposed perforation; and
a coupling device extendable through each horizontally-disposed perforation and the hole of the plate connection stud to secure the plate connection stud to the facing anchor, wherein the soil reinforcing element is capable of swiveling in a horizontal plane and shifting vertically over the distance X.

15. The system of claim 14, wherein the first and second lead ends are coupled to the first and second sides by resistance welding.

16. The system of claim 14, wherein the plurality of grooves are machined into the first and second sides.

17. The system of claim 14, wherein the plurality of grooves are cold-formed into the first and second sides.

18. A soil reinforcing element system, comprising:
a soil reinforcing element having first and second longitudinal wires welded to a plurality of transverse wires, the first and second longitudinal wires terminating at converging first and second lead ends, respectively; and
a plate connection stud comprising a planar tab defining at least one hole therein and a planar stem extending longitudinally from the planar tab, the planar stem having first and second opposing sides and the first and second converging lead ends being coupled to the first and second sides, respectively, wherein
the first and second sides of the planar stem define a plurality of grooves therein,
the plurality of grooves define ridges protruding from the first and second sides and extending in a direction perpendicular to a longitudinal axis of the planar stem,
at least one concave channel is defined in at least one protruding ridge, and
the concave channel extends in a direction perpendicular to the at least one protruding ridge.

* * * * *